(12) United States Patent
Kitano et al.

(10) Patent No.: US 9,970,382 B2
(45) Date of Patent: May 15, 2018

(54) DIRECT INJECTION INTERNAL COMBUSTION ENGINE

(71) Applicant: HONDA MOTOR CO., LTD., Tokyo (JP)

(72) Inventors: Haruya Kitano, Wako (JP); Susumu Nakajima, Wako (JP); Yasuhiro Okura, Wako (JP); Hiromitsu Hirano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 15/354,409

(22) Filed: Nov. 17, 2016

(65) Prior Publication Data

US 2017/0184046 A1  Jun. 29, 2017

(30) Foreign Application Priority Data

Dec. 25, 2015  (JP) .................................. 2015-254730

(51) Int. Cl.
*F02D 41/40*  (2006.01)
*F02B 31/00*  (2006.01)
(Continued)

(52) U.S. Cl.
CPC ............ *F02D 41/402* (2013.01); *F02B 31/00* (2013.01); *F02D 41/009* (2013.01); *F02M 61/14* (2013.01);
(Continued)

(58) Field of Classification Search
CPC ...... F02D 41/40; F02D 41/402; F02D 41/409; F02D 2200/021; F02D 2200/101;
(Continued)

(56) References Cited

U.S. PATENT DOCUMENTS 6,675,748 B2 *  1/2004  Ancimer ................... F02B 1/12
                                                 123/27 GE
8,196,560 B2 *  6/2012  Fujikawa .............. F02B 23/104
                                                 123/305
(Continued)

FOREIGN PATENT DOCUMENTS

DE          102 42 227 A1    3/2004
DE    10 2004 046 628 A1    4/2006
(Continued)

OTHER PUBLICATIONS

Office Action dated Jul. 18, 2017, issued in counterpart German Application No. 10 2016 225 439.1, with English translation. (25 pages).

*Primary Examiner* — Hieu T Vo
(74) *Attorney, Agent, or Firm* — Westerman, Hattori, Daniels & Adrian, LLP (57) ABSTRACT

A direct injection internal combustion engine has an injector for directly injecting fuel into a combustion chamber. A first fuel injection, a second fuel injection, and a third fuel injection are performed in one combustion cycle of the engine when a temperature of the engine is equal to or lower than a predetermined temperature. The second fuel injection is completed in a near-bottom dead center range of 160 deg. to 200 deg. after the top dead center at which the intake stroke starts, the first fuel injection is performed in a range which is set on the advance side of the near-bottom dead center range, and the third fuel injection is performed in a range which is set on the retard side of the near-bottom dead center range. The first and third fuel injections are completed in a range from 90 deg. to 270 deg. after the top dead center.

4 Claims, 4 Drawing Sheets

(51) Int. Cl.
*F02D 41/00* (2006.01)
*F02M 61/14* (2006.01)

(52) U.S. Cl.
CPC .. *F02D 2200/021* (2013.01); *F02D 2200/101* (2013.01); *F02D 2250/38* (2013.01); *Y02T 10/146* (2013.01); *Y02T 10/44* (2013.01)

(58) Field of Classification Search
CPC ... F02D 2250/38; F02M 61/14; Y02T 10/146; Y02T 10/44
See application file for complete search history.

(56) References Cited

U.S. PATENT DOCUMENTS 8,775,056 B2 * 7/2014 Fujii .................. F02D 41/08
    123/480
2011/0246048 A1   10/2011 Fujii et al.

FOREIGN PATENT DOCUMENTS

| DE | 10 2013 214 261 A1 | 1/2015 |
| DE | 10 2016 006 653 A1 | 12/2016 |
| JP | 2007-177731 A | 7/2007 |

* cited by examiner

DIRECT INJECTION INTERNAL COMBUSTION ENGINE

BACKGROUND OF THE INVENTION

Field of the Invention

The present invention relates to a direct injection internal combustion engine having an injector for directly injecting fuel into a combustion chamber thereof, and particularly to the direct injection internal combustion engine in which the fuel injection by the injector is performed three times in one combustion cycle.

Description of the Related Art

Japanese Patent Laid-open Publication No. 2007-177731 (JP'731) discloses a direct injection internal combustion engine in which the fuel injection by the injector is performed three times in one combustion cycle. Specifically, all of three injections are performed in the intake stroke of the object cylinder wherein the first injection is performed in the range from 0 deg. to 60 deg. after the top dead center at which the intake stroke starts (hereinafter referred to simply as "top dead center"), the second injection is performed in the range from 60 deg. to 140 deg. after the top dead center, and the third injection is performed from 140 deg. to 180 deg. after the top dead center.

In the case where the required fuel amount is supplied with only one fuel injection in the intake stroke, there exists a problem that an increasing amount of smoke and/or unburned gases becomes large. Accordingly, in the direct injection internal combustion engine shown in JP'731, the fuel injection is performed with three-divided injections. However, since the first injection is performed during the first half of the intake stroke, a generation amount of soot (smoke) is comparatively large when the temperature of the engine is low (before completion of the warming up of the engine). It is therefore desired to reduce the generation amount of soot.

SUMMARY OF THE INVENTION

The present invention is made contemplating the above-described point, and an objective of the present invention is to provide a direct injection internal combustion engine which can reduce the generation amount of soot before completion of the warming-up thereof.

To attain the above objective, the present invention provides a direct injection internal combustion engine having an injector (6) for directly injecting fuel into a combustion chamber (1a) thereof. In this engine, a first fuel injection (INJ1), a second fuel injection (INJ2), and a third fuel injection (INJ3) are performed in one combustion cycle of the engine when a temperature (TW) of the engine is equal to or lower than a predetermined temperature (TWTH). The second fuel injection (INJ2) is completed in a near-bottom dead center range of 160 deg. to 200 deg. after the top dead center at which the intake stroke starts, the first fuel injection (INJ1) is performed in a range which is set the advance side of the near-bottom dead center range, and the third fuel injection (INJ3) is preformed in a range which is set on the retard side of the near-bottom dead center range. Further, the first and third fuel injections (INJ1, INJ3) are completed in a range from 90 deg. to 270 deg. after the top dead center.

An engine coolant temperature or a lubricant oil temperature of the engine can be used, for example, as a parameter indicative of the temperature of the engine.

With this configuration, three-divided fuel injections performed in the range from the second half of the intake stroke to the first half of the compression stroke, the center of the range being the near-bottom dead center range. Accordingly, it is possible when the engine temperature is comparatively low to improve homogeneity of the air-fuel ratio of the air-fuel mixture in the combustion chamber, thereby ensuring higher combustion stability. Further, an amount of injected fuel adhered to the top surface of the piston decreases to make it possible to reduce the generation amount of soot.

Preferably, the angular interval between the first fuel injection (INJ1) and the second fuel injection (INJ2), and the angular interval between the second fuel injection (INJ2) and the third fuel injection (INJ3) are increased as the engine rotational speed (NE) increases.

With this configuration, the angular interval between the first and second fuel injections and the angular interval between the second and third fuel injections increase as the engine rotational speed increases. Accordingly, the fuel injections can be completed in the near-bottom center range as long as possible within the limit in the operation characteristic of the control device for controlling the injector. Consequently, the amount of the injected fuel adhered to the piston top surface can be suppressed, thereby reducing the generation amount of soot.

Preferably, the engine has an intake valve (7) between the combustion chamber (1a) and an intake port (2a), and is configured so that a tumble flow is generated in the combustion chamber by the intake air flowing into the combustion chamber through the intake valve. Further, the injector (6) is disposed in the vicinity of the intake valve (7) so that fuel is injected diagonally downward in the combustion chamber, and execution timings of the first to third fuel injections are advanced as the temperature (TW) of the engine rises.

In the engine where the tumble flow is generated in the combustion chamber, a strong rising flow of the tumble flow is generated in the range from the second half of the intake stroke to the first half of the compression stroke. Accordingly, a part of the injected fuel (especially, the fuel injected in the third fuel injection) may move up with the rising flow with high possibility to adhere to the cylinder wall near a position at which the injector is mounted. On the other hand, in the state where the temperature of the engine has risen, the generation amount of soot due to the fuel adhered to the piston top surface decreases. Consequently, advancing the execution timings of the first to third fuel injections as the engine temperature rises, makes it possible to suppress not only the generation of soot due to the fuel adhered to the piston top surface but also the generation of soot due to the adhesion of fuel to the cylinder wall caused by the tumble flow.

DETAILED DESCRIPTION OF THE PREFERRED EMBODIMENTS

Preferred embodiments of the present invention will now be described with reference to the drawings.

Figure 1:
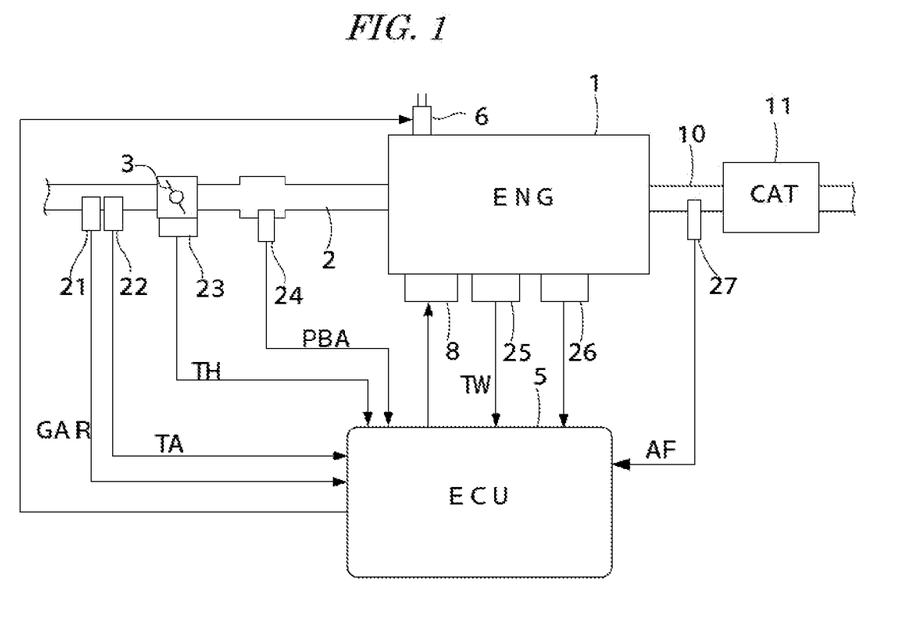
FIG. 1 shows a direct injection internal combustion engine and a control apparatus therefor according to one embodiment of the present invention.
Figure 2:
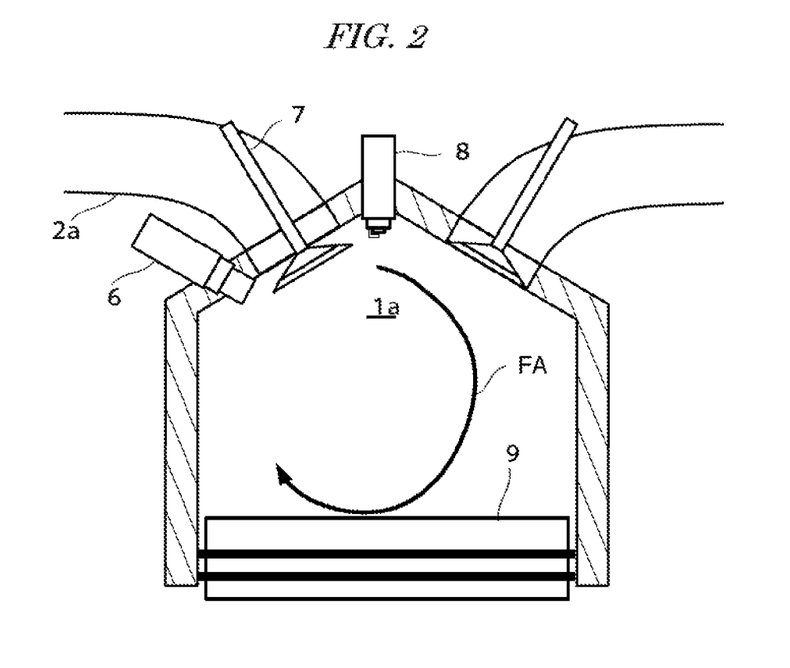
FIG. 2 schematically shows a configuration of a cylinder of the internal combustion engine shown in FIG. 1.

FIG. 1 shows a configuration of a direct injection internal combustion engine (hereinafter referred to as "engine") and a control apparatus therefor, according to one embodiment of the present invention. FIG. 2 schematically shows a configuration of a cylinder of the engine 1 shown in FIG. 1. An intake passage 2 is connected to the engine 1, and the intake passage 2 is provided with a throttle valve 3. The engine 1 has, for example, four cylinders, and each cylinder is provided with a piston 9. An intake port 2a, which branches out from the intake passage 2, opens to a combustion chamber 1a of each cylinder, and an intake valve 7 is disposed between the intake port 2a and the combustion chamber 1a. The engine 1 is configured so that a tumble flow FA is generated in the combustion chamber 1a by the intake air flowing into the combustion chamber 1a through the intake valve 7.

An injector 6 for directly injecting fuel into the combustion chamber 1a is provided in the vicinity of the intake valve 7 of each cylinder in the engine 1. The injector 6 is mounted so that fuel is injected diagonally downward in the combustion chamber 1a. Operation of the injector 6 is controlled by an electronic control unit (hereinafter referred to as "ECU") 5. An ignition plug 8 is mounted on each cylinder in the engine 1, and an ignition timing by the ignition plug 8 is controlled by the ECU 5.

An intake air flow rate sensor 21, an intake air temperature sensor 22, a throttle valve opening sensor 23, an intake pressure sensor 24, a coolant temperature sensor 25, and other sensors not shown are connected to the ECU 5, and the detected signals from these sensors are supplied to the ECU 5. The intake air flow rate sensor 21 detects an intake air flow rate of the engine 1, the intake air temperature sensor 22 detects an intake air temperature TA, the throttle valve opening sensor 23 detects a throttle valve opening TH, the intake pressure sensor 24 detects an intake pressure PBA, and the coolant temperature sensor 25 detects an engine coolant temperature TW. Other sensors include, for example, an accelerator sensor for detecting an operation amount of the accelerator of the vehicle driven by the engine 1, a vehicle speed sensor for detecting a running speed of the vehicle, and the like.

A crank angle position sensor 26 for detecting a rotation angle of a crankshaft (not shown) of the engine 1, and pulse signals according to the rotation angle of the crankshaft is supplied to the ECU 5. The crank angle position sensor outputs a plurality of pulse signals indicative of the crank angle position, and the pulse signals are used for detecting an engine rotational speed NE, and for controlling the fuel injection timing, the ignition timing, and the like.

An exhaust passage 10 of the engine 1 is provided with a three-way catalyst 11 for purifying the exhaust gases. A proportional type oxygen concentration sensor 27 (hereinafter referred to as "LAF sensor 27") is mounted on the upstream side of the three-way catalyst 11 and the downstream side of a collecting portion of the exhaust manifold communicating with each cylinder of the engine 1. The LAF sensor 27 outputs a detection signal substantially proportional to the oxygen concentration (air-fuel ratio) in the exhaust gases and supplies the detection signal to the ECU 5.

The ECU 5 includes an input circuit, a central processing unit (hereinafter referred to as "CPU"), a memory circuit, and an output circuit. The input circuit performs numerous functions, including shaping the waveforms of input signals from the various sensors, correcting the voltage levels of the input signals to a predetermined level, and converting analog signal values into digital signal values. The memory circuit preliminarily stores various operating programs to be executed by the CPU and stores the results of computations, or the like, by the CPU. The output circuit supplies actuation signals to the injectors 6 and the ignition plugs 8, and the like.

An amount of fuel injected by the injector 6 (fuel injection amount) is controlled by correcting a basic fuel amount with an air-fuel ratio correction coefficient KAF, wherein the basic fuel amount is calculated according to the intake air flow rate GAIR, and the air-fuel ratio correction coefficient KAF is calculated according to an air-fuel ratio AF detected by the LAF sensor 27 so that the detected air-fuel ratio AF coincides with a target air-fuel ratio AFCMD.

Figure 3A:
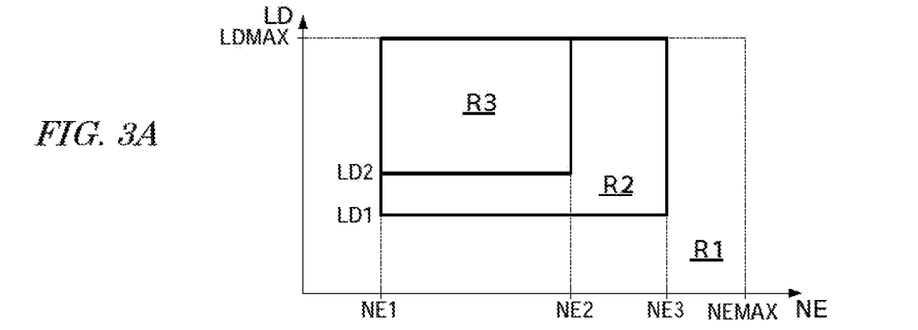
FIGS. 3A and 3B are drawings for explaining how the r of fuel injections in one combustion cycle is set.
Figure 3B:
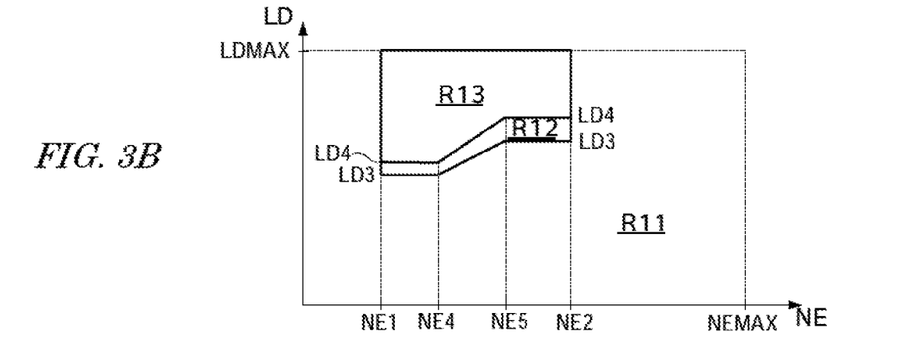

FIGS. 3A and 3B are drawings for explaining how the number of fuel injections in one combustion cycle (hereinafter referred to as "fuel injection number NINJ) is set, which show engine operating regions defined by the engine rotational speed NE and an engine load parameter LD. FIG. 3A corresponds to an engine operating condition where the engine coolant temperature TW is lower than a predetermined temperature TWTH (e.g., 60 degrees centigrade) before completion of the warming-up of the engine 1. FIG. 3B corresponds to an engine operating condition where the warming-up of the engine 1 is completed (TW is equal to or higher than 75 degrees centigrade). The intake air flow rate GAIR or the intake pressure PBA is, for example, used as the engine load parameter LD.

When the temperature of the engine 1 is comparatively low, the fuel injection number NINJ is set to "3" in the region R3. In the regions R2 and R1 the fuel injection number NINJ is respectively set to "2" and "1". The region R3 of FIG. 3A is a low speed high load region where the engine rotational speed NE is equal to or higher than a first rotational speed NE1 and lower than a second rotational speed NE2, and the engine load parameter LD is equal to or greater than a second boundary load LD2 and equal to or less than the maximum load LDMAX. The first engine rotational speed NE1 corresponds to an idling rotational speed of the engine 1.

The region R2 comprises a low speed medium load region and a medium speed medium/high load region. In the low speed medium load region, the engine rotational speed NE is equal to or higher than the first rotational speed NE1 and lower than the second rotational speed NE2, and the engine load parameter LD is equal to or greater than a first boundary load LD1 and less than the second boundary load LD2. In the medium speed medium/high load region, the engine rotational speed NE is equal to or higher than the second rotational speed NE2 and lower than a third rotational speed NE3, and the engine load parameter LD is equal to or greater than the first boundary load LD1 and equal to or less than the maximum load LDMAX. The region R1 comprises a low load region and a high speed region other than the regions R2 and R3. NEMAX shown in FIGS. 3A and 3B indicates the maximum rotational speed.

After completion of the warming-up of the engine 1, the fuel injection number NINJ is set to "3", "2", and "1" respectively in the regions R13, R12, and R11 shown in FIG. 3B. The region R13 is a low speed high load region where the engine rotational speed NE is equal to or higher than the first rotational speed NE1 and lower than the second rotational speed NE2, and the engine load parameter LD is equal to or greater than a fourth boundary load LD4 and equal to or less than the maximum load LDMAX. The region R12 is a medium speed medium load region where the engine rotational speed NE is equal to or higher than the second rotational speed NE1 and lower than the second rotational speed NE2, and the engine load parameter LD is equal to or greater than a third boundary load LD3 and less than the fourth boundary load LD4.

It is to be noted that the third and fourth boundary load LD3 and LD4 are set so as to increase as the engine rotational speed NE increases from a fourth rotational speed NE4 to a fifth rotational speed NE5. The region R11 comprises a low load region and a medium/high speed region other than the regions R12 and R13. The boundary loads LD1-LD4 are set so as to satisfy the relationships of LD1<LD3 and LD2<LD4.

Figure 4:
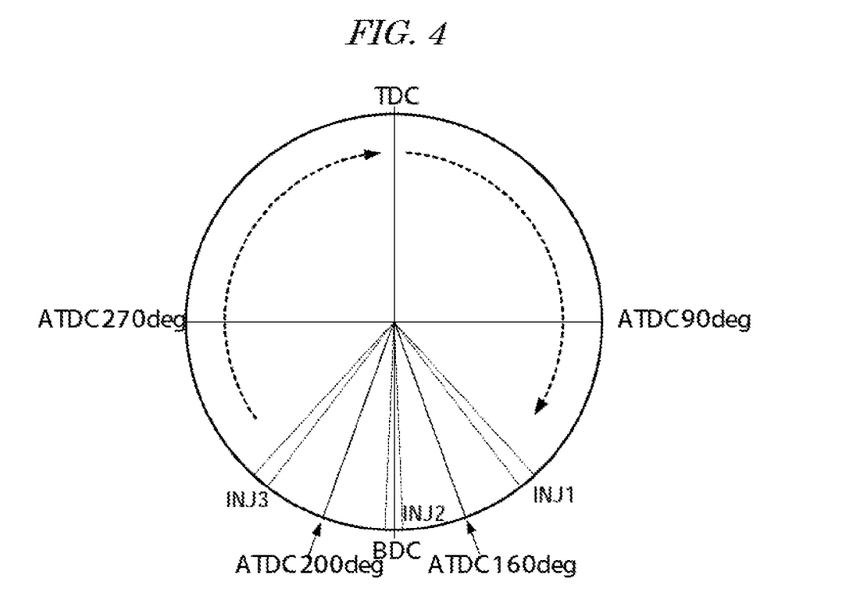
FIG. 4 is a drawing for explaining execution timings of three-divided injections.

As shown in FIG. 3A, in this embodiment, the fuel injection number NINJ is set to "3" to perform three-divided fuel injections in the low speed high load operating region R3, when the temperature of the engine 1 is comparatively low (before completion of the warming-up). As shown in FIG. 4, the second fuel injection INJ2 is completed in a crank angular range from 160 deg. to 200 deg. after the top dead center at which the intake stroke starts. The crank angular range from 160 deg. to 200 deg., which includes the bottom dead center (BDC) at which the intake stroke ends, is hereinafter referred to as "near-bottom dead center range".

It is to be noted that the angular range means the crank angular range in this specification. The first fuel injection INJ1 is performed in a first injection range which is set on the advance side of the near-bottom dead center range, and the third fuel injection INJ3 is performed in a third injection range which is set on the retard side of the near-bottom dead center range. Further, the first and third fuel injections INJ1 and INJ3 are completed in a range from 90 deg. to 270 deg. after the top dead center.

More specifically, the first injection INJ1 is performed in the first injection range from 30 deg. to 50 deg. advanced from the execution timing CAI2nd of the second injection INJ2, the first injection range being set on the advance side with respect the near-bottom dead center range. The third injection INJ3 is performed h the third injection range from 30 deg. to 50 deg. retarded from the execution timing CAI2nd of the second injection INJ2, the third injection range being the retard side with respect the ear-bottom dead center range. "ATDC" shown in FIG. 4 means "after the top dead center at which the intake stroke starts".

Fuel injection amounts corresponding to the first to third injections are set to a value obtained by dividing the required fuel amount calculated according to the operation condition of the engine 1 by '3', which means that the fuel injection amounts of the three-divided injections are equal to each other.

Figure 5A:
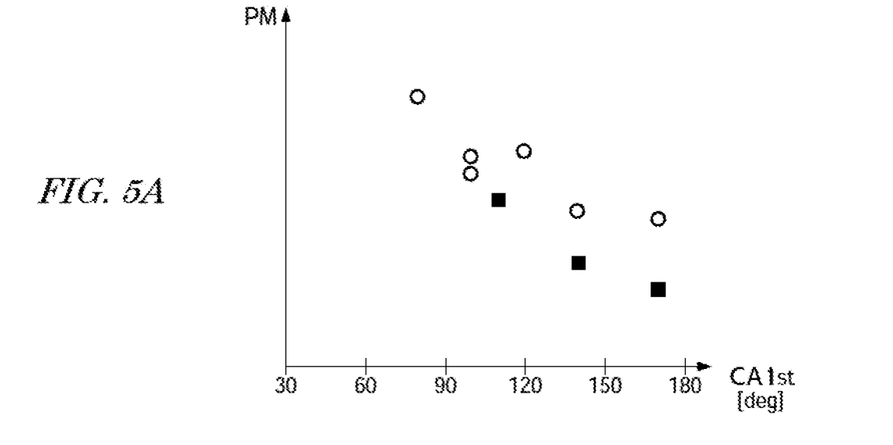
FIGS. 5A-5C are drawings for explaining the effects obtained by performing the three-divided injections.
Figure 5B:
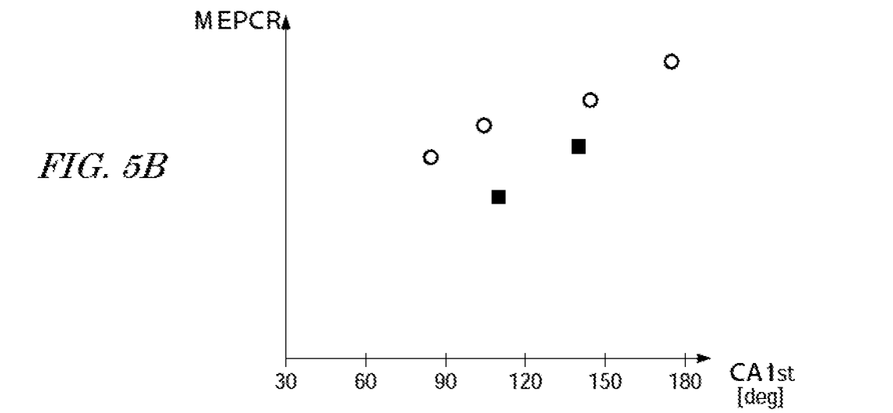
Figure 5C:
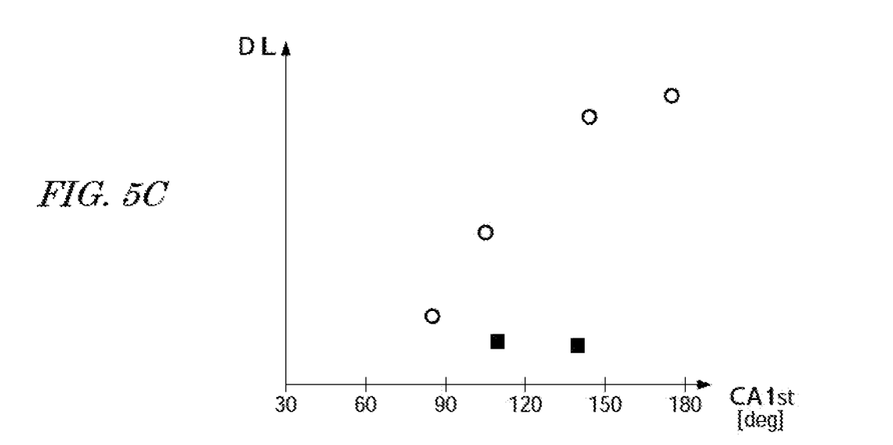

The advantage obtained by performing the three-divided injections in the region R3 when the temperature of the engine 1 is comparatively low, is described below with reference to FIGS. 5A-5C. In FIGS. 5A-5C, the symbols of "○" indicate data corresponding to the case where the fuel injection of which the fuel injection number NINJ is "1" (hereinafter referred to as "single injection" is performed, and the symbols of "■" indicate data corresponding to the case where the three-divided injections described above are performed.

CAI1st of the horizontal axis indicates the execution tinning of the single injection, or the execution timing of the first injection INJ1 for the three-divided injections. In the following description, the "first injection timing CAI1st" represents the execution timings of the three-divided injections. The angle of the horizontal axis indicates an angle after the top dead center at which the intake stroke starts. It is to be noted that the data of the three-divided injections shown in FIGS. 5A-5C, 6A, and 6B are obtained by performing the second injection INJ2 at an angle of 40 deg. after the first injection timing CAI1 and performing the third injection INJ3 at an angle of 40 deg. after the execution timing of the second injection INJ2.

FIG. 5A shows a relationship between the fuel injection timing and an amount PM of soot discharged when the vehicle driven by the engine 1 runs a constant distance (hereinafter referred to as "soot amount PM"). According to FIG. 5A, it is confirmed that the soot amount PM decreases as the fuel injection timing is retarded in the intake stroke, and the soot amount PM of the three-divided injections is less than that of the single injection.

FIG. 5B shows a relationship between the fuel injection timing and a fluctuation rate IMEPCR of the indicated mean effective pressure (hereinafter referred to as "combustion fluctuation rate IMEPCR"). According to FIG. 5B, it is confirmed that the combustion fluctuation rate IMEPCR increases as the fuel injection timing is retarded in the intake stroke, and the combustion fluctuation rate IMEPCR of the three-divided injections is less than that of the single injection. Less combustion fluctuation rate IMEPCR means that homogeneity of the air-fuel ratio of the air-fuel mixture in the combustion chamber 1a is greater than that of the single injection, and the combustion stability is improved.

FIG. 5C shows a relationship between the fuel injection timing and a degree DIL of dilution of the lubricant oil (hereinafter referred to as "oil dilution degree DIL"). According to FIG. 5C, it is confirmed that the oil dilution degree DIL of the single injection remarkably increases as the fuel injection timing is retarded, while the oil dilution degree DIL of the three-divided injections is remarkably reduced compared with that of the single injection. It is also confirmed that the oil dilution degree DIL of the three-divided injections changes little when the fuel injection timing changes.

As described above, the three-divided injections make it possible to reduce the soot amount PM and to suppress increase in the combustion fluctuation rate IMEPCR and increase in the oil dilution degree DIL.

The angular ranges of the execution timings of the three-divided fuel injections are set mainly for suppressing the soot amount PM before warming-up of the engine 1, i.e., when the coolant temperature TW of the engine 1 is lower than the predetermined temperature TWTH. In the case where the execution timing of the first injection INJ1 is set on the advance side with respect to 90 deg. and the case where the execution timing of the third injection INJ3 is set on the retard side with respect to 270 deg., an amount of fuel adhered to the piston top surface increases, which results in insufficient reduction of the soot amount PM.

Further, it is preferable to shorten the execution intervals between the two consecutive injections of the three-divided injections. However, in this embodiment, the internals are set to a value in the angular range from 30 deg. to 50 deg. The reason for this setting is that there exists a restriction depending on the engine rotational speed NE with respect to the operation characteristic of the ECU 5. By increasing the intervals within the angular range from 30 deg. to 50 deg. as the engine rotational speed NE rises, the fuel injections can be completed in the near-bottom center range as long as possible within the limit in the operation characteristic of the ECU 5.

Consequently, the amount of fuel adhered to the piston top surface can be suppressed, thereby reducing the amount of soot. Further, by making the execution intervals between the divided injections as short as possible after completion of the warming-up of the engine 1, the fuel injections can be completed before the rising flow of the tumble flow FA begins to push up the injected fuel.

Figure 6A:
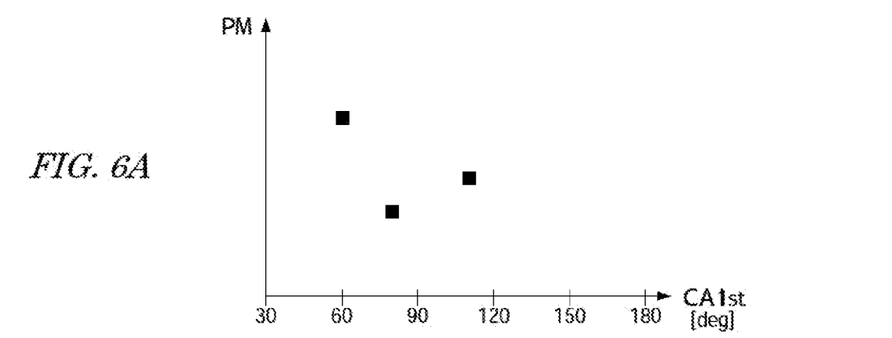
FIG. 6A shows a relationship between an execution timing (CAI1st) of the fuel injection and a soot generation amount (PM) after completion of the warming-up of the internal combustion engine.

FIG. 6A shows a relationship between the first injection timing CAI1st and the soot amount PM after completion of the warming-up of the engine 1, when the three-divided injections are performed in the region R13 shown in FIG. 3B. The soot amount PM takes a minimum value when the first injection timing CAI1st is set to a value of about ATDC 80 deg., which is different from the relationship shown in FIG. 5B.

According to study of the inventors of the present invention, when the temperature of the engine 1 is comparatively low, it is conformed that the main factor for generating soot is the fuel adhered to the piston top surface which defines the combustion chamber 1a. By performing the fuel injection when the piston is at a position which is remotest from the injector 6, that is, in the near-bottom center range, it is possible to reduce the amount of fuel adhered to the piston top surface, thereby making the soot amount PM minimum.

On the other hand, when the temperature of the engine 1 rises after completion of the warming-up, it is confirmed that an amount of soot generated due to the fuel adhered to the piston top surface decreases, and a part of the injected fuel is returned to a place near the injector 6 with the rising flow of the tumble flow FA generated in the combustion chamber 1a, to adhere to the wall near the injector 6. Accordingly, the soot generation amount increases due to the fuel adhered to the wall near the injector 6.

Figure 6B:
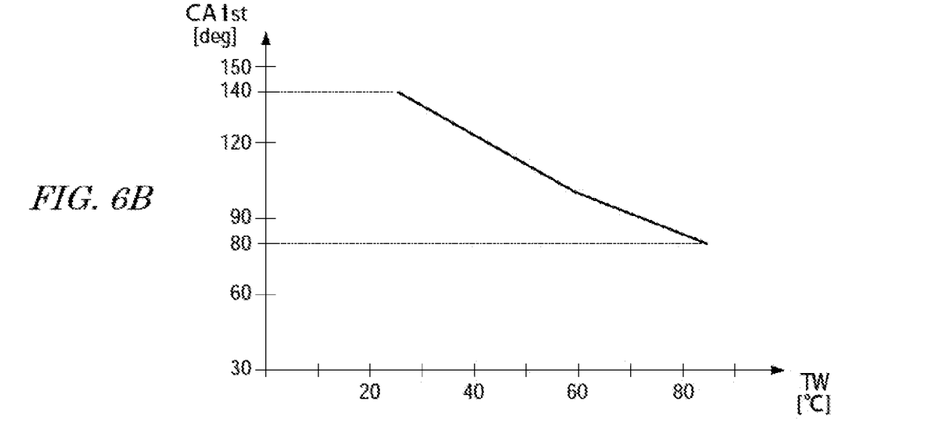
FIG. 6B shows a relationship between an engine coolant temperature (TW) and the execution timing (CAI1st) of the fuel injection.

Consequently, it is preferable to advance the first injection timing CAI1st as shown in FIG. 6B according to the temperature of the engine 1, i.e., the engine coolant temperature TW. By advancing the first injection timing CAI1st as the engine coolant temperature rises, an amount of fuel injected during the first half of the compression stroke where the rising flow of the tumble flow FA becomes strong, can be reduced to suppress the soot amount PM. It is to be noted that the lower limit value (advance limit value) of the first injection timing CAI1st is set to ATDC 80 deg., since the soot amount PM increases as shown in FIG. 6A if the first injection timing CAI1st is advanced further from ATDC 80 deg.

Figure 7:
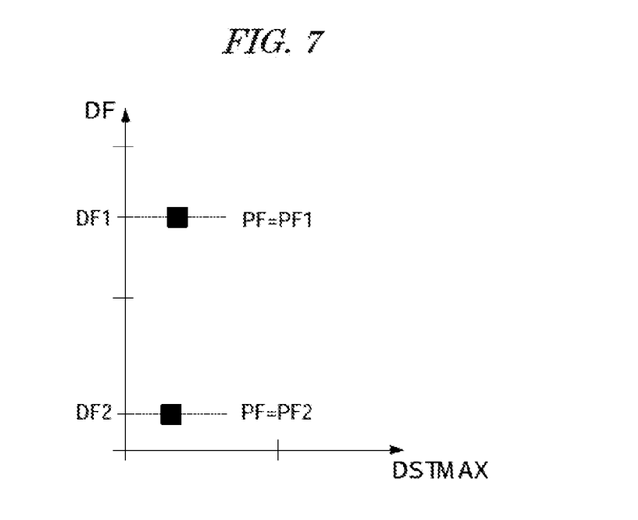
FIG. 7 shows a relationship between a maximum reachable distance (DSTMAX) of the injected fuel and a diameter (DF) of the fuel which is atomized by the injection.

FIG. 7 shows a relationship between a maximum reachable distance DSTMAX of the injected fuel and a diameter DF of the fuel which is atomized by the injection (hereinafter referred to as "atom diameter DF"). When a fuel pressure PF which is a pressure of fuel supplied to the injector 6 is equal to a first fuel pressure PF1, the atom diameter DF takes a first value DF1. When the fuel pressure PF is set to a second fuel pressure PF2 which is twice as the first fuel pressure PF1, the maximum reachable distance DSTMAX little changes, but the atom diameter DF decreases to a second value DF2 which is about 20% less than the first value DF1. Accordingly, raising the fuel pressure makes it possible to atomize the injected fuel to smaller atoms, thereby enhancing the combustion stability as well as reducing the soot amount.

As described above, in this embodiment, the three-divided fuel injections are performed in the range from the second half of the intake stroke to the first half of the compression stroke, the center of the range being the near-bottom dead center range. Accordingly, it is possible when the engine temperature is comparatively low to improve homogeneity of the air-fuel ratio of the air-fuel mixture in the combustion chamber 1a, thereby ensuring higher combustion stability. Consequently, an amount of injected fuel adhered to the top surface of the piston decreases to make it possible to reduce the generation amount of soot.

Further, the angular intervals indicated by the crank angle between the three-divided fuel injections are controlled to increase as the engine rotational speed NE increases. Accordingly, the fuel injections can be completed in the near-bottom center range as long as possible within the limit in the operation characteristic of the ECU 5 for controlling the injector 6. Consequently, the amount of the injected fuel adhered to the piston top surface can be suppressed, thereby reducing the generation amount of soot. Further, by making the execution intervals between the divided injections as short as possible after completion of the warming-up of the engine 1, the fuel injections can be completed before the rising flow of the tumble flow FA begins to push up the injected fuel.

In the combustion chamber 1a of the engine 1, a strong rising flow of the tumble flow FA is generated in the range from the second half of the intake stroke to the first half of the compression stroke. Accordingly, a part of the injected fuel (especially, the fuel injected in the third fuel injection INJ3) may move up with the rising flow with high possibility to adhere to the cylinder wall near the position at which the injector 6 is mounted. On the other hand, in the state where the temperature of the engine 1 has risen, the generation amount of soot due to the fuel adhered to the piston top surface decreases. Consequently, by advancing the execution timings of the first to third fuel injections as he engine temperature rises, it is possible to suppress not only the generation of soot due to the fuel adhered to the piston top surface but also the generation of soot due to the fuel adhered to the cylinder wall caused by the tumble flow FA.

The present invention is not limited to the embodiment described above, and various modifications may be made. For example, in the above-described embodiment, the direct injection internal combustion engine having four cylinders is shown. The present invention is applicable to the direct injection internal combustion engine having any number of cylinders.

What is claimed is:

1. A direct injection internal combustion engine having an injector for directly injecting fuel into a combustion chamber thereof,
    wherein a first fuel injection, a second fuel injection, and a third fuel injection are performed in one combustion cycle of said engine when a temperature of said engine is equal to or lower than a predetermined temperature,
    wherein the second fuel injection is completed in a near-bottom dead center range of 160 deg. to 200 deg. after the top dead center at which the intake stroke starts, the first fuel injection is performed in a range which is set on the advance side of the near-bottom dead center range, and the third fuel injection is performed in a range which is set on the retard side of the near-bottom dead center range, wherein the first and third fuel injections are completed in a range from 90 deg. to 270 deg. after the top dead center.

2. The direct injection internal combustion engine according to claim 1, wherein an angular interval between the first fuel injection and the second fuel injection, and an angular interval between the second fuel injection and the third fuel injection are increased as the rotational speed of said engine increases.

3. The direct injection internal combustion engine according to claim 2, having an intake valve between the combustion chamber and an intake port, wherein said engine is configured so that a tumble flow is generated in the combustion chamber by the intake air flowing into the combustion chamber through said intake valve, and said injector is disposed in the vicinity of said intake valve so that fuel is injected diagonally downward in the combustion chamber, wherein execution timings of the first to third fuel injections are advanced as the temperature of said engine rises.

4. The direct injection internal combustion engine according to claim 1, having an intake valve between the combustion chamber and an intake port, wherein said engine is configured so that a tumble flow is generated in the combustion chamber by the intake air flowing into the combustion chamber through said intake valve, and said injector is disposed in the vicinity of said intake valve so that fuel is injected diagonally downward in the combustion chamber, wherein execution timings of the first to third fuel injections are advanced as the temperature of said engine rises.

* * * * *